US011803794B2

(12) United States Patent
Malireddy et al.

(10) Patent No.: US 11,803,794 B2
(45) Date of Patent: Oct. 31, 2023

(54) METHOD AND SYSTEM FOR PROCESS VISUALIZATION THROUGH NETWORK DISCOVERY

(71) Applicant: JPMorgan Chase Bank, N.A., New York, NY (US)

(72) Inventors: Srinivasa Reddy Malireddy, Tampa, FL (US); Kevin A. Kidd, Tampa, FL (US); Tena M. Vozenilek, Tampa, FL (US); Ronald T. Hempel, Tampa, FL (US); Joanne K. Jarvis, Oldsmar, FL (US); Shaku Francis, Tampa, FL (US); Daniel A. Flores, Tampa, FL (US); Kelly Dugas, Columbus, OH (US); Janice R. Murray, Sarasota, FL (US); April Rizzo, Apollo Beach, FL (US)

(73) Assignee: JPMORGAN CHASE BANK, N.A., New York, NY (US)

(*) Notice: Subject to any disclaimer, the term of this patent is extended or adjusted under 35 U.S.C. 154(b) by 338 days.

(21) Appl. No.: 16/836,412

(22) Filed: Mar. 31, 2020

(65) Prior Publication Data
US 2021/0097457 A1 Apr. 1, 2021

Related U.S. Application Data

(60) Provisional application No. 62/906,284, filed on Sep. 26, 2019.

(51) Int. Cl.
*G06Q 10/0633* (2023.01)
*G06F 11/30* (2006.01)
(Continued)

(52) U.S. Cl.
CPC ..... *G06Q 10/0633* (2013.01); *G06F 11/3006* (2013.01); *G06F 11/3086* (2013.01); *G06F 16/904* (2019.01); *H04L 67/51* (2022.05)

(58) Field of Classification Search
CPC ............ G06Q 10/0633; G06F 11/3006; G06F 11/3086; G06F 16/904; G06F 11/323;
(Continued)

(56) References Cited

U.S. PATENT DOCUMENTS

| 2002/0026297 A1* | 2/2002 | Leymann | G06Q 10/10 719/330 |
| 2005/0114201 A1* | 5/2005 | Walsh | G06Q 10/10 709/200 |
| 2018/0032997 A1* | 2/2018 | Gordon | G06Q 30/0269 |

FOREIGN PATENT DOCUMENTS

| CN | 107426063 A * 12/2017 | .......... H04L 61/1511 |
| CN | 115220597 A * 10/2022 | |

(Continued)

*Primary Examiner* — Emmanuel L Moise
*Assistant Examiner* — Mariegeorges A Henry
(74) *Attorney, Agent, or Firm* — Greenblum & Bernstein, P.L.C.

(57) ABSTRACT

A method for providing a notification of applications that relate to a business process is provided. The method includes collecting identification data that relates to each of a plurality of applications connected to the at least one processor; storing the identification data; receiving a user request for information that includes a list of first applications that relate to the business process; analyzing the identification data to determine whether each respective one of the plurality of applications is to be included in the list; and generating the list based on a result of the analyzing and notifying the user of the list. The method also includes collecting network data that relates to each of the plurality of applications; storing the network data; and analyzing the network data to determine whether each respective one of the plurality of applications is to be added to the list.

18 Claims, 6 Drawing Sheets

(51) Int. Cl.
*G06F 16/904* (2019.01)
*H04L 67/51* (2022.01)

(58) Field of Classification Search
CPC .. G06F 17/40; G06F 2201/865; G06F 11/302; G06F 11/3051; H04L 67/16
USPC .................................................. 705/346–348
See application file for complete search history.

(56) References Cited

FOREIGN PATENT DOCUMENTS

FR             2845847 A1 *    4/2004   ........... H04L 41/142
WO     WO-2021079719 A1 *    4/2021   ............. G06Q 30/06

* cited by examiner

METHOD AND SYSTEM FOR PROCESS VISUALIZATION THROUGH NETWORK DISCOVERY

CROSS-REFERENCE TO RELATED APPLICATIONS

This application claims the benefit of U.S. Provisional Patent Application Ser. No. 62/906,284, filed Sep. 26, 2019, which is hereby incorporated by reference in its entirety.

BACKGROUND

1. Field of the Disclosure

This technology generally relates to methods and systems for process visualization and, more particularly, to methods and systems for providing a notification of applications that relate to a business process.

2. Background Information

Business process mapping is a way to visualize what a business does by taking into account roles, responsibilities, and standards. A business user employs visual process maps to quickly understand interactions between various key processes. Historically, business process mappings are used by businesses to map interactions between people who carry out the work and what steps or actions are performed.

One drawback of conventional forms of business process visualization is the difficulty associated with mapping all business processes, including processes running on connected applications. As a result, many business process visualizations are limited to presentations of interactions between known processes and known connected applications. Such a limitation forces the user to only visualize processes and applications that the user already knows, thereby preventing business process optimizations for all connected processes and applications—especially so for very large businesses with large numbers of connected applications.

Therefore, there is a need to optimize business processes by discovering all currently connected applications and fully visualizing the business processes that incorporates the connected applications.

SUMMARY

The present disclosure, through one or more of its various aspects, embodiments, and/or specific features or sub-components, provides, inter alia, various systems, servers, devices, methods, media, programs, and platforms for providing a notification of applications that relate to a business process.

According to an aspect of the present disclosure, a method for providing a notification of applications that relate to a business process is provided. The method is implemented by at least one processor. The method includes collecting identification data that relates to each of a plurality of applications connected to at least one processor; storing the identification data; receiving a user request for information that includes a list of applications that relate to the business process; analyzing the identification data to determine whether each respective one of the plurality of applications is to be included in the list; and generating the list based on a result of the analysis and notifying the user of the list.

In accordance with an exemplary embodiment, the method may further include collecting network data that relates to each of the plurality of applications; storing the network data; and analyzing the network data to determine whether each respective one of the plurality of applications is to be added to the list.

In accordance with an exemplary embodiment, the network data may include at least one of an Internet Protocol address, host detail, and a port number, each of which may be obtained from at least one of a gateway, a router, a system security log, an application log, a server log, a message queues log, a file transfer system log, a cloud route log, and application reference data.

In accordance with an exemplary embodiment, the analyzing of the network data may further comprise, for each respective one of the plurality of applications, comparing the identification data to the network data, and determining that the respective one may include a dependent application when at least one function thereof is dependent upon another application.

In accordance with an exemplary embodiment, the analyzing may further comprise, for each respective one of the plurality of applications, comparing the identification data to at least one business capability taxonomy, and determining that the respective one may be potentially compromised when at least one function thereof is not aligned with the business capability taxonomy pattern.

In accordance with an exemplary embodiment, the method may further include formatting the generated list into at least one of a textual record, a diagram, and a visual process map, wherein each of the diagram and the visual process map may include a plurality of representative symbols connected by lines, wherein the representative symbols may represent respective steps in the business process, and wherein the lines may represent flow paths between the steps in the business process.

In accordance with an exemplary embodiment, the method may further include displaying the list of initial applications on at least one graphical user interface; and displaying each of the plurality of applications connected to at least one processor on the at least one graphical user interface.

In accordance with an exemplary embodiment, at least one alert or visual indicator may be displayed on the graphical user interface upon a determination that at least one application is not to be included in the list of first applications.

In accordance with an exemplary embodiment, the user request may include a request for at least one of a real-time visual representation and an archived visual representation of the business process.

According to another aspect of the present disclosure, a computing device configured to implement an execution of a method for providing a notification of applications that relate to a business process is provided. The computing device comprising: a display screen; a processor; a memory; and a communication interface coupled to each of the processor, the memory, and the display screen, wherein the processor may be configured to: collect identification data that relates to each of a plurality of applications connected to the at least one processor; store the identification data in the memory; receive a user request for information that includes a list of first applications that relate to the business process; analyze the identification data to determine whether each respective one of the plurality of applications is to be included in the list; and generate the list based on a result of the analyzing and notifying the user of the list.

In accordance with an exemplary embodiment, the processor may be further configured to: collect network data that may relate to each of the plurality of applications; store the network data in the memory; and analyze the network data to determine whether each respective one of the plurality of applications is to be added to the list.

In accordance with an exemplary embodiment, the network data may include at least one of an Internet Protocol address, a host detail, a port number obtained from at least one gateway, a router, a system security log, an application log, a server log, a message queues log, a file transfer system log, a cloud route log, and application reference data.

In accordance with an exemplary embodiment, the processor may be further configured to analyze the network data, for each respective one of the plurality of applications, by comparing the identification data to the network data, and determining that the respective one is a dependent application when at least one function thereof is dependent upon another application.

In accordance with an exemplary embodiment, the processor may be further configured to analyze, for each respective one of the plurality of applications, by comparing the identification data to at least one business capability taxonomy, and determining that the respective one may be potentially compromised when at least one function thereof is not included in the at least one business capability taxonomy.

In accordance with an exemplary embodiment, the processor may be further configured to: format the generated list into at least one of a textual record, a diagram, and a visual process map, wherein each of the diagram and the visual process map may include a plurality of representative symbols connected by lines, wherein the representative symbols may represent respective steps in the business process, and wherein the lines may represent flow paths between the steps in the business process.

In accordance with an exemplary embodiment, the processor may be further configured to cause the display screen to display the list of first applications on at least one graphical user interface; and display each of the plurality of applications connected to the at least one processor on the at least one graphical user interface.

In accordance with an exemplary embodiment, the processor may be further configured to cause the display screen to display at least one alert on the graphical user interface upon a determination that at least one application is not to be included in the list of first applications.

In accordance with an exemplary embodiment, the user request may include a request for at least one of a real-time visual representation and an archived visual representation of the business process.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
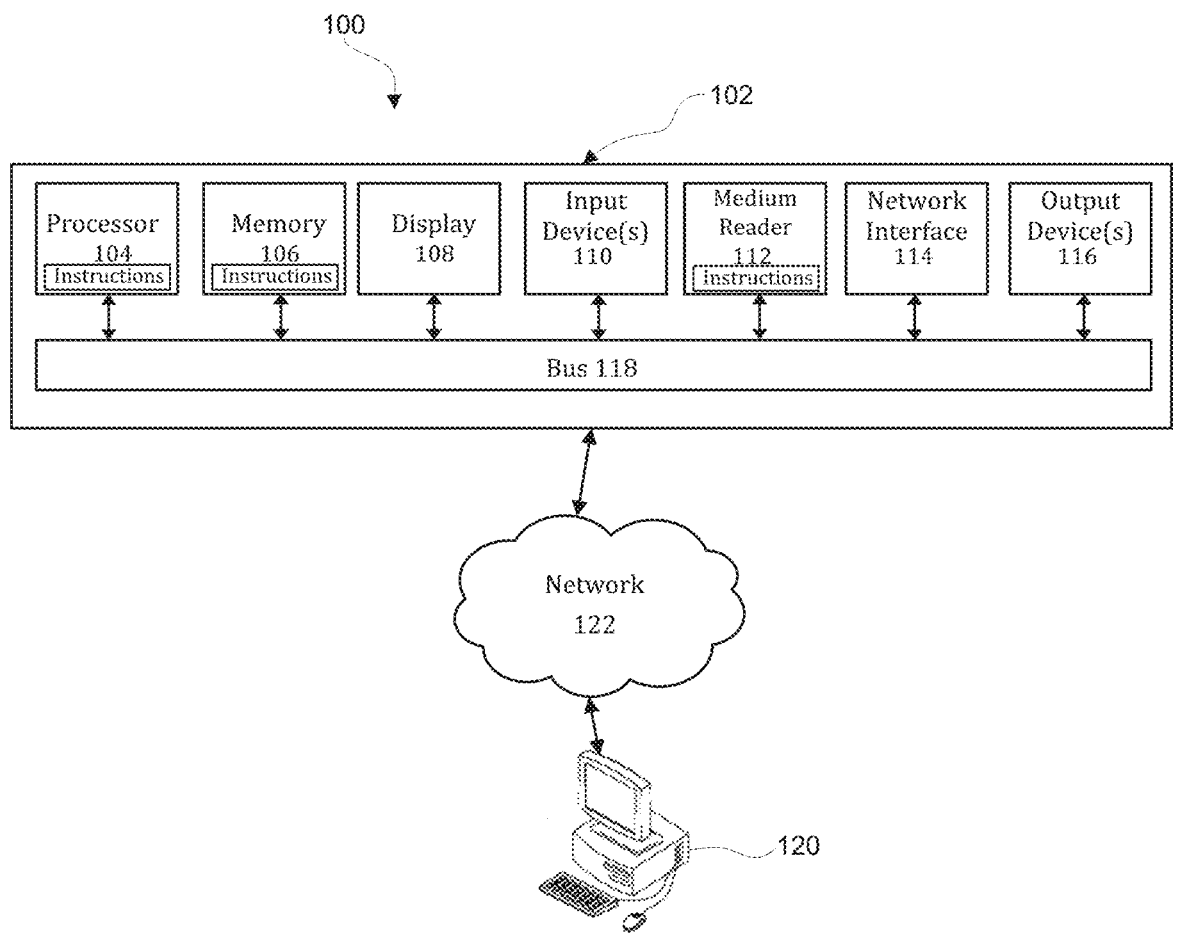
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing a notification of applications that relate to a business process.

Figure 2:
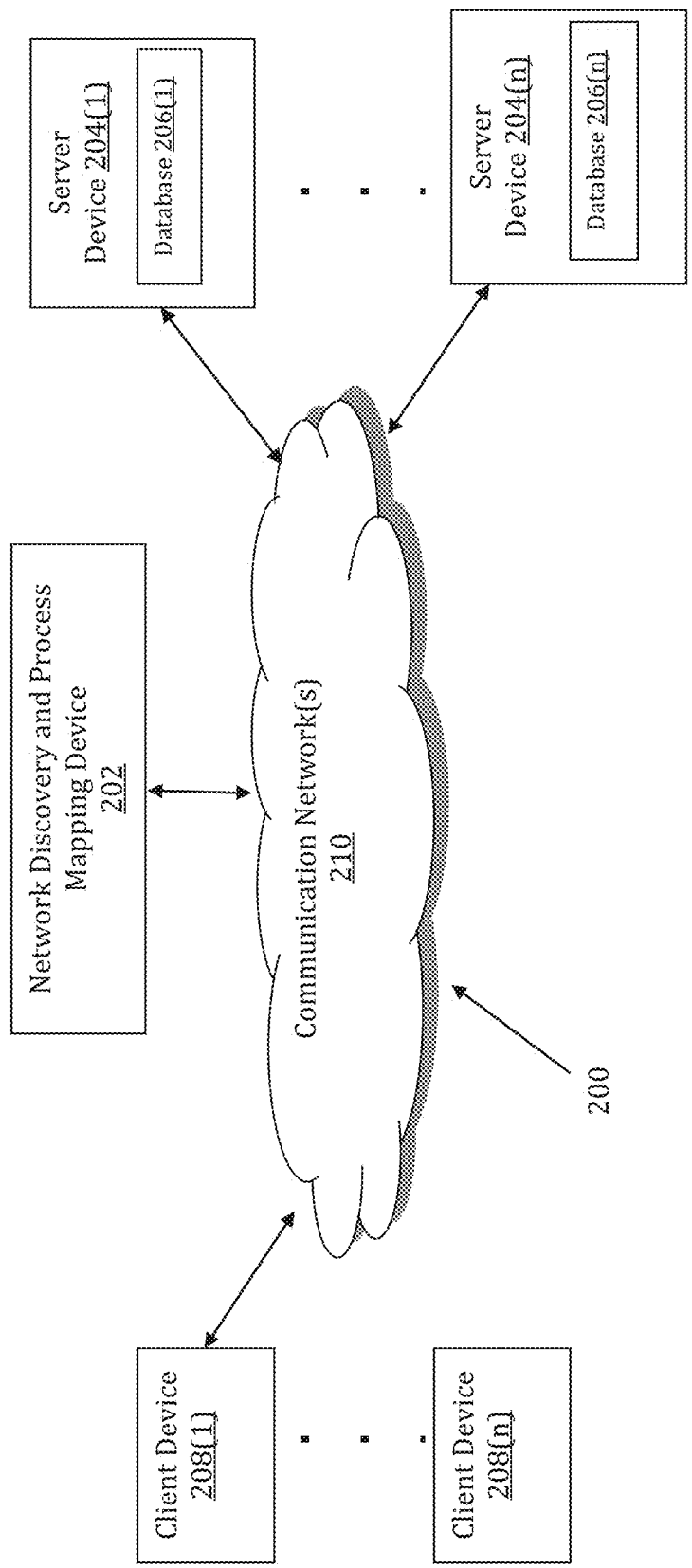
FIG. 2 illustrates an exemplary diagram of a network environment.

Referring to FIG. 2, a schematic of an exemplary network environment 200 for implementing a method for providing a notification of applications that relate to a business process is illustrated. In an exemplary embodiment, the method is executable on any networked computer platform, such as, for example, a personal computer (PC).

The method for providing a notification of applications that relate to a business process may be implemented by a Network Discovery and Process Mapping (NDPM) device 202. The NDPM device 202 may be the same or similar to the computer system 102 as described with respect to FIG. 1. The NDPM device 202 may store one or more applications that can include executable instructions that, when executed by the NDPM device 202, cause the NDPM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the NDPM device 202 itself, may be located in virtual server(s) running in a cloud-based computing environment rather than being tied to one or more specific physical network computing devices. Also, the application(s) may be running in one or more virtual machines (VMs) executing on the NDPM device 202. Additionally, in one or more embodiments of this technology, virtual machine(s) running on the NDPM device 202 may be managed or supervised by a hypervisor.

In the network environment 200 of FIG. 2, the NDPM device 202 is coupled to a plurality of server devices 204(1)-204(n) that hosts a plurality of databases 206(1)-206(n), and also to a plurality of client devices 208(1)-208(n) via communication network(s) 210. A communication interface of the NDPM device 202, such as the network interface 114 of the computer system 102 of FIG. 1, operatively couples and communicates between the NDPM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the NDPM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and NDPM servers that efficiently implement a method for providing a notification of applications that relate to a business process.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The NDPM device 202 may be a standalone device or integrated with one or more other devices or apparatuses, such as one or more of the server devices 204(1)-204(n), for example. In one particular example, the NDPM device 202 may include or be hosted by one of the server devices 204(1)-204(n), and other arrangements are also possible. Moreover, one or more of the devices of the NDPM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the NDPM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to collected identification data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the NDPM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the NDPM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the NDPM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the NDPM device 202, the server devices 204(1)-204(n), or the client devices 208(1)-208(n), for example, may be configured to operate as virtual instances on the same physical machine. In other words, one or more of the NDPM device 202, the server devices 204(1)-204(n), or the client devices 208(1)-208(n) may operate on the same physical device rather than as separate devices communicating through communication network(s) 210. Additionally, there may be more or fewer NDPM device 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
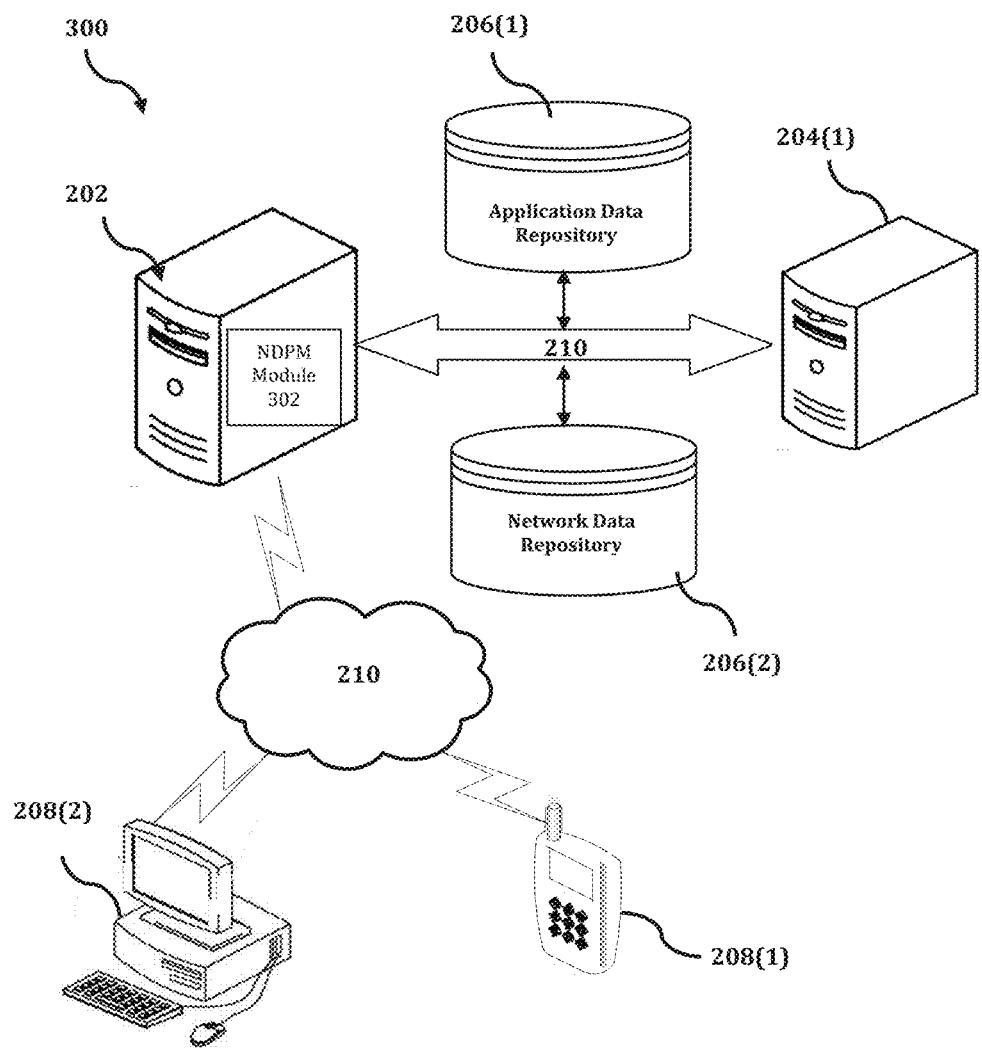
FIG. 3 shows an exemplary system for implementing a method for providing a notification of applications that relate to a business process.

The NDPM device 202 is described and shown in FIG. 3 as including a network discovery and process mapping (NDPM) module 302, although it may include other rules, policies, modules, databases, or applications, for example. As will be described below, the NDPM module 302 collects identification data for the NDPM device 202 and the NDPM device 202 is configured to implement a method for providing a notification of applications that relate to a business process.

An exemplary process 300 for implementing a mechanism for providing a notification of applications that relate to a business process by utilizing the network environment of FIG. 2 is shown as being executed in FIG. 3. Specifically, a first client device 208(1) and a second client device 208(2) are illustrated as being in communication with NDPM device 202. In this regard, the first client device 208(1) and the second client device 208(2) may be "clients" of the NDPM device 202 and are described herein as such. Nevertheless, it is to be known and understood that the first client device 208(1) and/or the second client device 208(2) need not necessarily be "clients" of the NDPM device 202, or any entity described in association therewith herein. Any additional or alternative relationship may exist between either or both of the first client device 208(1) and the second client device 208(2) and the NDPM device 202, or no relationship may exist.

Further, NDPM device 202 is illustrated as being able to access an application data repository 206(1) and a network data repository 206(2). As such, the NDPM module 302 is also able to access and interact with the application data repository 206(1) and the network data repository 206(2). The NDPM device 202 may be configured to access these databases for implementing a method for providing a notification of applications that relate to a business process.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the NDPM device 202 via broadband or cellular communication. Of course, these embodiments are merely exemplary and are not limiting or exhaustive.

Upon being started, the NDPM module 302 executes a process for collecting, continuously or periodically based on user preference, application network data from all applications connected to the NDPM device 202. Using the collected identification data in the application data repository 206(1) and the collected network data in the network data repository 206(2), the NDPM device 202 automatically determines business processes and connected applications through network discovery. An exemplary process for providing a notification of applications that relate to a business process is generally indicated at flowchart 400 in FIG. 4.

Figure 4:
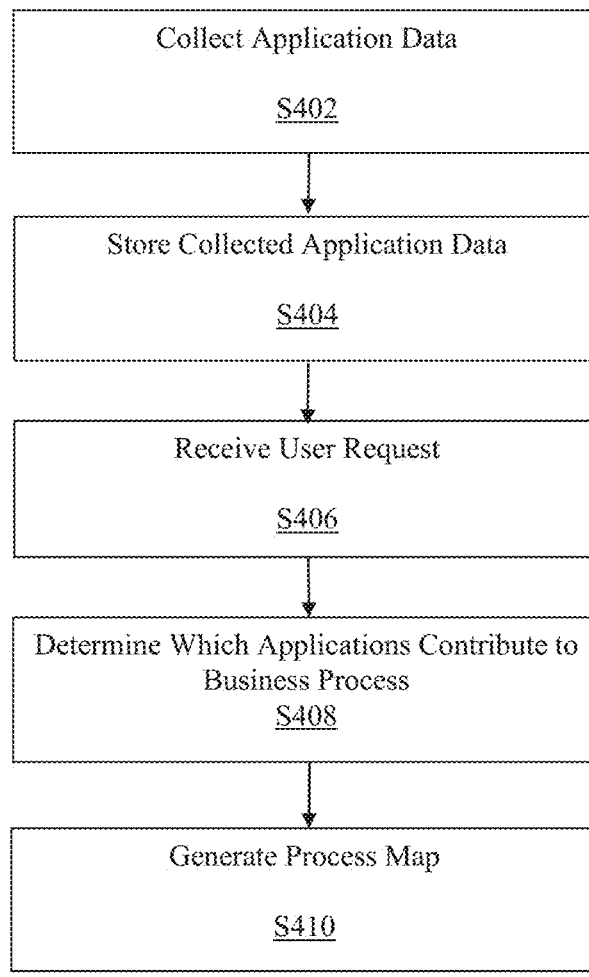
FIG. 4 is a flowchart of an exemplary process for implementing a method for providing a notification of applications that relate to a business process.

In flowchart 400 of FIG. 4, at step S402, the NDPM module 302 collects identification data from each of a plurality of applications connected to the NDPM device 202. In an exemplary embodiment, the identification data may include application usage data, application network data, and application reference data. In another exemplary embodiment, the identification data may be obtained from all connected applications or from any one of several combinations of selected applications as desired by the user. In another exemplary embodiment, the identification data may be collected continuously (i.e., in real-time) or periodically as desired by the user. As will be appreciated by a person of ordinary skill in the art, the collection rate of identification data may be accomplished in any combination desired by the user.

In another exemplary embodiment, network data that relates to each of a plurality of applications may also be collected together with identification data. Network data may include at least one of an Internet Protocol address, host details, and a port number, each of which may be obtained from at least one wide area network (WANs), a gateway, a router, a system security log, an application log, a server log, a message queues log, a file transfer system log, a cloud route log, and application reference data. The above enumerated network data types are presented as examples only and should not be interpreted as limiting. Any and all types of network data, network traffic data, and network identification data may be collected in any combination.

At step S404, the NDPM module 302 stores the identification data. In an exemplary embodiment, the identification data may be stored in application data repository 206(1). In another exemplary embodiment, the network data may be stored in network data repository 206(2). As described in further detail above, the application data repository 206(1) and the network data repository 206(2) may be integrated or connected to the NDPM device 202 in any combination desired by the user. In another exemplary embodiment, the identification data and the network data may be categorized and then archived in application data repository 206(1) and network data repository 206(2), respectively, based on any combination of collected time or user specified collection parameters (i.e., archived based on collection of only transaction applications or only audit processes).

At step S406, the NDPM module 302 receives a user request for information that may include a list of first applications that relate to the business process. In an exemplary embodiment, the request for information may include a request to display at least one of a diagram and a visual process map of business processes together with the list of first applications. In another exemplary embodiment, the user request may be received at an input of the client device. In another exemplary embodiment, the diagram and the visual process map may include at least one network flow diagram, a network flow model, and a network flowchart. In another exemplary embodiment, the user request may correspond to at least one of a real-time visual representation and an archived visual representation of desired business processes. The user may request the diagram and the visual process map in any presentation type (i.e., real-time or archived) and in any combination that may be desired by the user.

At step S408, the NDPM module 302 analyzes the identification data to determine whether each respective one of the plurality of applications may be included in the list. Then, at step S410, the NDPM module 302 generates the list based on a result of the analyzing and notifies the user of the list. In an exemplary embodiment, the NDPM module 302 may also analyze the network data together with the identification data to determine whether each respective one of the plurality of applications may be included in the list. As will be appreciated by a person of ordinary skill in the art, each respective one of the plurality of applications may or may not be determined to be included in the list in every instance of analysis as applications may connect and disconnect frequently from one period of time to another.

In an exemplary embodiment, the NDPM module 302 may use the identification data to determine that each respective one of the plurality of applications may not be included in the list of first applications when at least one function of the respective application may not correlate with a predefined or known business process. In another exemplary embodiment, the NDPM module 302 may use the identification data to determine that each respective one of the plurality of applications may not be included in the list of first applications when the respective application may not be a predefined or known application.

In another exemplary embodiment, the NDPM module, for each respective one of the plurality of applications, may compare the identification data to at least one business capability taxonomy. In another exemplary embodiment, determining that the respective one of the plurality of applications may potentially be compromised when at least one function thereof may not be included in the at least one business capability taxonomy.

In another exemplary embodiment, the identification data together with the network data may be compared to the at least one business capability taxonomy to determine that the respective one of the plurality of applications may be potentially compromised. As will be appreciated by a person of ordinary skill in the art, business capability taxonomy patterns vary depending on user circumstances (i.e., business type, business size, business complexity, etc.) and a variety of business capability taxonomy patterns may also be used. In another exemplary embodiment, the NDPM module, for each respective one of the plurality of applications, may compare the identification data to the network data to determine a relationship between the plurality of applications based on functional information. The relationship may include an independent application with an independent function and a dependent application with a dependent function, which rely on results from the independent function.

In another exemplary embodiment, the NDPM module 302 may format the generated list into at least one of a textual record, a diagram, and a visual process map. In another exemplary embodiment, the textual record, the diagram, and the visual process map may include both the list of first applications and each of the plurality of applications connected to the at least one processor. In another exemplary embodiment, the diagram and the visual process map may comprise a plurality of representative symbols connected by lines. The representative symbols may be selected from any desired symbols, or combination of symbols, to represent respective steps in the business process. Similarly, the representative lines may be selected from any desired line design, or combination of lines, to represent respective flow paths between the steps in the business process.

In another exemplary embodiment, the list of first applications together with each of the plurality of applications connected to the at least one processor may be displayed on a graphical user interface. In another exemplary embodiment, the list together with each of the plurality of applications may be represented on at least one of a network flow diagram, a network flow model, and a network flowchart. In an exemplary embodiment, the at least one of the network flow diagram, the network flow model, and the network flowchart may be a real-time visual representation of business processes. In another exemplary embodiment, the at least one of the network flow diagram, the network flow model, and the network flowchart may be a visual representation of business processes from archived data.

In another exemplary embodiment, an alert may be displayed on the graphical user interface upon detection of at least one of the plurality of applications that may not be included in the list of first applications. In another exemplary embodiment, the alert may be displayed at a separate device connected to the client device (i.e., a companion wearable computing device). In another exemplary embodiment, the alert may be integrated into the graphical user interface. In another exemplary embodiment, the alert may be at least one of a visual alert, an audible alert, an active alert (i.e., the user is alerted right away), and a passive alert (i.e., the alert is sent to the user at a predetermined specified time).

In another exemplary embodiment, NDPM module 302 may visually highlight the at least one of the plurality of applications determined to not be included in the list of first applications. In another exemplary embodiment, the at least one of the plurality of applications may be visually highlighted on the at least one graphical user interface that may be displaying at least one of the textual list, the diagram, and the visual process map. As will be appreciated by a person of ordinary skill in the art, the at least one of the plurality of applications may be designated for highlighting by NDPM module 302 and by a selection from the user.

In another exemplary embodiment, the visual highlighting may be a display layer on the graphical user interface that may be user-selectable and may be superimposed onto the at least one of the textual list, the diagram, and the visual process map. In another exemplary embodiment, NDPM module 302 may visually highlight an application as a dependent application and an independent application based on whether the functions of the application depend upon the results of another application.

Figure 5:
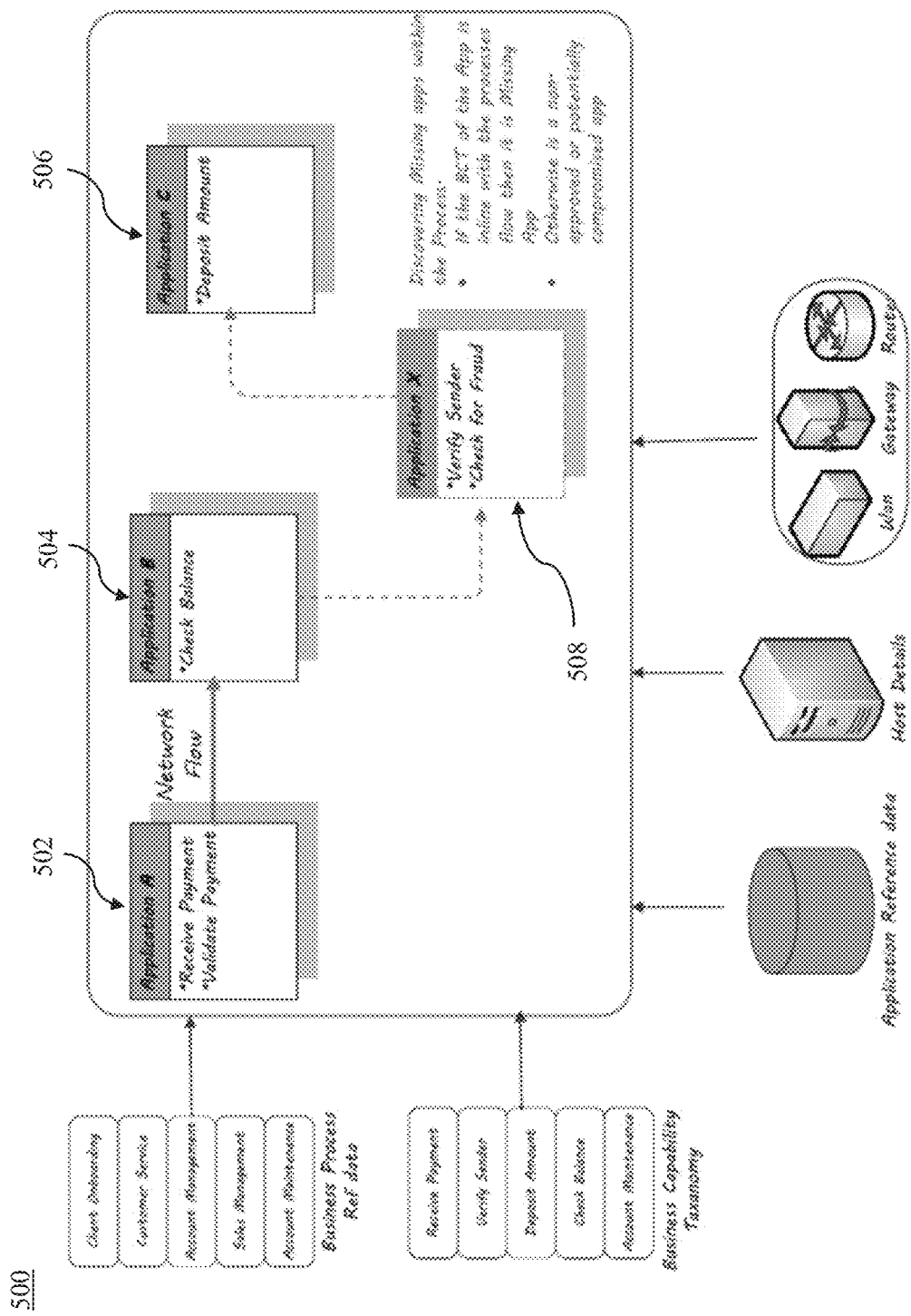
FIG. 5 is a process map of an exemplary process for implementing a method for providing a notification of applications that relate to a business process.

FIG. 5 is a process map 500 of an exemplary process for implementing a method for providing a notification of applications that relate to a business process. The process map shown in FIG. 5 provides a visual overview of the analysis process and how each of a plurality of applications may be determined to not be included in the list of first applications that relate to the business process. The example is provided to enhance understanding of the disclosed method only and should not be limiting.

As illustrated in FIG. 5, the exemplary method operates within a connected system such as, for example, a system where application reference data and host details may be collected from WANs, Gateways, and routers. In an exemplary embodiment, the collected data may be visually mapped based on respective business processes performed by the applications. In another exemplary embodiment, the mapped business process may be compared to reference data of known business processes. The known processes may include, but is not limited to, client onboarding, customer service, account management, sales management, and account maintenance. In another exemplary embodiment, the comparison may enable a user to visually inspect and optimize existing business processes.

In another exemplary embodiment, the mapped business processes may be validated with business capability taxonomy patterns. The business capability taxonomy patterns may include expected business processes such as receiving payment, verifying sender, depositing amount, checking balance, and account maintenance. The validation of business processes against known business capability taxonomy patterns may enable a user to determine whether the connected application may be potentially compromised. For example, when at least one of the plurality of applications that may be determined to not be included in the list of first applications performs at least one function beyond those prescribed in the business capability taxonomy pattern, then the at least one of the plurality of applications may be compromised and may be performing unwanted actions.

FIG. 5 further provides an example business process system mapping that may include applications determined to be previously known to be part of the business process (i.e., known applications) and applications that may be determined to not have previously been known to be part of the business process (i.e., unknown applications). Here, known applications A 502, B 504, and C 506 are mapped out together with unknown Application X 508. Application A 502 starts the network flow by executing commands to receive payment and to validate the payment. The network flow then continues to Application B 504 where a balance may be checked. Through network discovery, the network flow may be seen moving from Application B 504 to an unknown Application X 508 before moving to Application C 506 where the amount may be deposited. In an exemplary embodiment, the discovery process may enable the user to see what specific actions may be performed by the unknown application. In this example, Application X 508 is performing the functions of verifying sender and checking for fraud.

In another exemplary embodiment, the determination that at least one of the plurality of applications may be unknown, and the functions that the unknown application performs, may enable an audit of the unknown application. For instance, as provided in FIG. 5, when the business capability taxonomy of the at least one of a plurality of applications corresponds with known business process flow, then the unknown application may be at least one of the plurality of applications missing from known processes performing legitimate functions. In this situation, the user may wish to add the unknown application and further optimize the business process. Alternatively, when the business capability taxonomy of at least one of the plurality of applications does not correspond with known business process flow, then the at least one of the plurality of applications may be performing an unwanted function and may be an unapproved or potentially compromised application.

Figure 6:
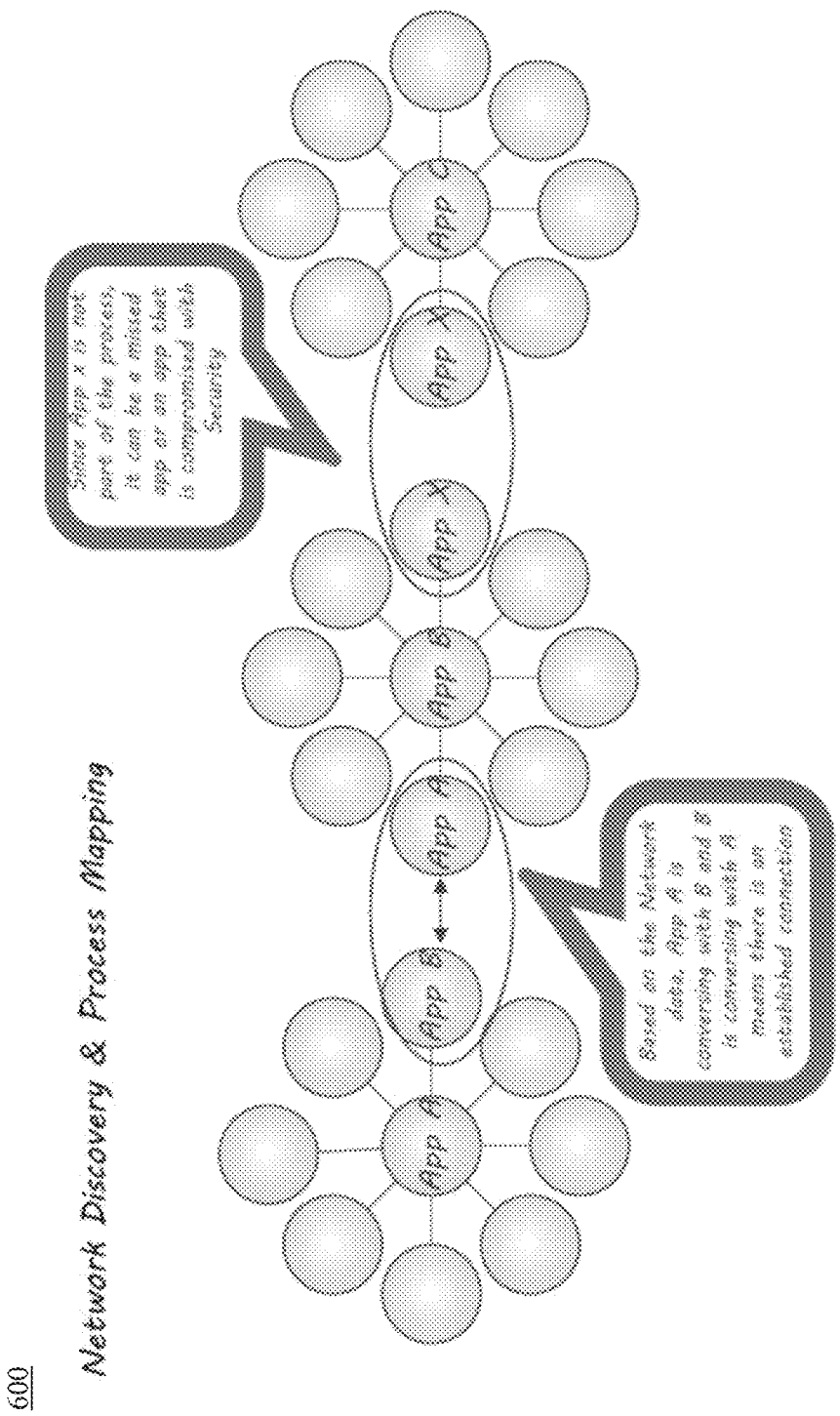
FIG. 6 is a visual representation of the network discovery and mapping process for connected applications.

FIG. 6 is a visual representation 600 of the network discovery process for connected applications, according to an exemplary embodiment. In FIG. 6, identification data and network data may be used to show application interconnectivity. Here, known applications A 502, B 504, and C 506 are shown together with respective connections for each application.

Based on the collected data, Application A 502 interacts directly with Application B 504 and Application B 504 interacts directly with Application A 502. Thus, from interaction data, there may be an established connection between Application A 502 and Application B 504. However, in the case of Application B 504 and Application C 506, when known applications interact with an unknown application, then the unknown application may either be a missing application or a potentially malicious application as illustrated in FIG. 5. Further, because both Application B 504 and Application C 506 interacts with unknown Application X 508, it may be deduced that Application X 508 may be in the business process flow between Application B 504 and Application C 506.

Accordingly, with this technology, an optimized process for business process visualization and, more particularly, for providing a notification of applications that relate to a business process.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A method for providing a notification of applications that relate to a business process, the method comprising:
    collecting, by at least one processor, identification data that relates to each of a plurality of applications connected to the at least one processor, the identification data including application usage data, application network data, and application reference data;
    generating, by the at least one processor, a visual mapping of the collected identification data based on a corresponding business process that is performed by each of the plurality of applications;

comparing, by the at least one processor, the visual mapping to process reference data of known processes;
storing, by the at least one processor in a memory, the identification data by,
  categorizing, by the at least one processor, the identification data based on a corresponding collection time and at least one user specified collection parameter; and
  archiving, by the at least one processor, the categorized identification data in the memory;
receiving, by the at least one processor via an input, a user request for information that includes a list of first applications that relate to the business process and for a network flow diagram of the business process, the network flow diagram including a network flow model and a network flowchart;
analyzing, by the at least one processor, the identification data to determine whether each respective one of the plurality of applications is to be included in the list; and
generating, by the at least one processor, the list based on a result of the analyzing and notifying a user of the list.

2. The method of claim 1, further comprising:
collecting, by the at least one processor, network data that relates to each of the plurality of applications;
storing, by the at least one processor in a memory, the network data; and
analyzing, by the at least one processor, the network data to determine whether each respective one of the plurality of applications is to be added to the list.

3. The method of claim 2, wherein the network data includes at least one from among an Internet Protocol address, a host detail, a port number obtained from at least one gateway, a router, a system security log, an application log, a server log, a message queues log, a file transfer system log, a cloud route log, and application reference data.

4. The method of claim 2, wherein the analyzing of the network data further comprises:
for each respective one of the plurality of applications, comparing the identification data to the network data, and determining that the respective one is a dependent application when at least one function thereof is dependent upon another application.

5. The method of claim 1, wherein the analyzing further comprises:
for each respective one of the plurality of applications, comparing the identification data to at least one business capability taxonomy, and determining that the respective one is potentially compromised when at least one function thereof is not included in the at least one business capability taxonomy.

6. The method of claim 1, further comprising:
formatting the generated list into at least one from among a textual record, a diagram, and a visual process map, wherein each of the diagram and the visual process map includes a plurality of representative symbols connected by lines, wherein the representative symbols represent respective steps in the business process, and wherein the lines represent flow paths between the steps in the business process.

7. The method of claim 1, further comprising:
displaying, by the at least one processor via a display, the list of first applications on at least one graphical user interface; and
displaying, by the at least one processor via the display, each of the plurality of applications connected to the at least one processor on the at least one graphical user interface.

8. The method of claim 7, wherein at least one alert is displayed on the graphical user interface and on a companion wearable computing device upon a determination that at least one application is not to be included in the list of first applications, the at least one alert including a visual alert and an audible alert.

9. The method of claim 1, wherein the user request includes a request for at least one from among a real-time visual representation and an archived visual representation of the business process.

10. A computing device configured to implement an execution of a method for providing a notification of applications that relate to a business process, the computing device comprising:
a processor;
a memory; and
a communication interface coupled to each of the processor and the memory,
wherein the processor is configured to:
  collect identification data that relates to each of a plurality of applications connected to the at least one processor, the identification data including application usage data, application network data, and application reference data;
  generate a visual mapping of the collected identification data based on a corresponding business process that is performed by each of the plurality of applications;
  compare the visual mapping to process reference data of known processes;
  store the identification data in the memory by causing the processor to:
    categorize the identification data based on a corresponding collection time and at least one user specified collection parameter; and
    archive the categorized identification data in the memory;
  receive a user request for information that includes a list of first applications that relate to the business process and for a network flow diagram of the business process, the network flow diagram including a network flow model and a network flowchart;
  analyze the identification data to determine whether each respective one of the plurality of applications is to be included in the list; and
  generate the list based on a result of the analyzing and notifying a user of the list.

11. The computing device of claim 10, wherein the processor is further configured to:
collect network data that relates to each of the plurality of applications;
store the network data in the memory; and
analyze the network data to determine whether each respective one of the plurality of applications is to be added to the list.

12. The computing device of claim 11, wherein the network data includes at least one from among an Internet Protocol address, a host detail, a port number obtained from at least one gateway, a router, a system security log, an application log, a server log, a message queues log, a file transfer system log, a cloud route log, and application reference data.

13. The computing device of claim 11, wherein the processor is further configured to analyze the network data, for each respective one of the plurality of applications, by comparing the identification data to the network data, and determining that the respective one is a dependent application when at least one function thereof is dependent upon another application.

14. The computing device of claim 10, wherein the processor is further configured to analyze, for each respective one of the plurality of applications, by comparing the identification data to at least one business capability taxonomy, and determining that the respective one is potentially compromised when at least one function thereof is not included in the at least one business capability taxonomy.

15. The computing device of claim 10, wherein the processor is further configured to:
format the generated list into at least one from among a textual record, a diagram, and a visual process map, wherein each of the diagram and the visual process map includes a plurality of representative symbols connected by lines, wherein the representative symbols represent respective steps in the business process, and wherein the lines represent flow paths between the steps in the business process.

16. The computing device of claim 10 further comprising a display screen, wherein the processor is further configured to cause the display screen to:
display the list of first applications on at least one graphical user interface; and
display each of the plurality of applications connected to the at least one processor on the at least one graphical user interface.

17. The computing device of claim 16, wherein the processor is further configured to cause the display screen and a companion wearable computing device to display at least one alert on the graphical user interface upon a determination that at least one application is not to be included in the list of first applications, the at least one alert including a visual alert and an audible alert.

18. The computing device of claim 10, wherein the user request includes a request for at least one from among a real-time visual representation and an archived visual representation of the business process.

* * * * *